US008482795B2

(12) United States Patent
Nishikawa

(10) Patent No.: US 8,482,795 B2
(45) Date of Patent: Jul. 9, 2013

(54) IMAGE FORMING APPARATUS AND SYSTEM FOR SELECTING A DOUBLE-SIDE PRINTING METHOD BASED ON THE REMAINING TONER AMOUNT

(75) Inventor: Naoki Nishikawa, Nagoya (JP)

(73) Assignee: Brother Kogyo Kabushiki Kaisha, Nagoya-Shi, Aichi-ken (JP)

( * ) Notice: Subject to any disclaimer, the term of this patent is extended or adjusted under 35 U.S.C. 154(b) by 654 days.

(21) Appl. No.: 12/732,815

(22) Filed: Mar. 26, 2010

(65) Prior Publication Data

US 2010/0302561 A1 Dec. 2, 2010

(30) Foreign Application Priority Data

May 29, 2009 (JP) ................................. 2009-130330

(51) Int. Cl.
*H04N 1/60* (2006.01)

(52) U.S. Cl.
USPC ............ 358/1.9; 358/1.15; 358/1.18; 399/24; 399/27; 399/53; 399/61; 399/306

(58) Field of Classification Search
None
See application file for complete search history.

(56) References Cited

U.S. PATENT DOCUMENTS 5,966,555 A * 10/1999 Nakajima et al. ............... 399/18
6,473,196 B2 * 10/2002 Usami et al. ................. 358/1.18
6,624,910 B1 * 9/2003 Koh et al. .................... 358/1.18
6,898,398 B2 * 5/2005 Omata et al. .................. 399/159
7,038,812 B2 5/2006 Hashimoto et al.
7,185,962 B2 * 3/2007 Takahashi et al. .............. 347/14
7,458,674 B2 * 12/2008 Itoh .............................. 347/104
7,843,587 B2 * 11/2010 Kanakubo .................... 358/1.15
8,150,277 B2 * 4/2012 Takiguchi ....................... 399/27
8,182,058 B2 * 5/2012 Itoh ................................ 347/14
8,331,815 B2 * 12/2012 Nishikawa ...................... 399/53
2001/0021031 A1 9/2001 Hashimoto et al.
2005/0135856 A1 6/2005 Uchida et al.

(Continued)

FOREIGN PATENT DOCUMENTS

CN 1627208 6/2005
JP 6-24050 A 2/1994

(Continued)

OTHER PUBLICATIONS

Japanese Official Action dated Apr. 19, 2011 together with an English language translation from JP 2009-130330.

(Continued)

*Primary Examiner* — Dung Tran
(74) *Attorney, Agent, or Firm* — Scully, Scott, Murphy & Presser, P.C.

(57) ABSTRACT

An image forming apparatus includes a determination unit determining whether an amount of colorant remaining in a container is equal to or greater than a threshold value and a control unit causing a print unit selectively to perform plural double-side printing methods in which at least one of the number of one-side printed sheets N and the number of opposite-side printed sheets M is different. When the determination unit makes a negative determination, the control unit performs a negative selection process of selecting a double-side printing method satisfying at least one condition of a condition that the number of one-side printed sheets N is smaller than that when the determination unit makes an affirmative determination and a condition that the number of opposite-side printed sheets M is greater than that when the determination unit makes the affirmative determination.

10 Claims, 8 Drawing Sheets

U.S. PATENT DOCUMENTS

| | | | | |
|---|---|---|---|---|
| 2008/0240826 | A1 | 10/2008 | Shen | |
| 2009/0279108 | A1* | 11/2009 | Hoshi et al. | 358/1.2 |
| 2010/0278578 | A1* | 11/2010 | Yamada | 400/582 |
| 2010/0303491 | A1* | 12/2010 | Nishikawa | 399/53 |
| 2011/0243637 | A1* | 10/2011 | Nakamura et al. | 400/583 |

FOREIGN PATENT DOCUMENTS

| | | | |
|---|---|---|---|
| JP | 7-152287 | | 6/1995 |
| JP | 7-246739 | A | 9/1995 |
| JP | 8-52907 | A | 2/1996 |
| JP | 9-244388 | | 9/1997 |
| JP | 9-244510 | A | 9/1997 |
| JP | 11-284818 | A | 10/1999 |
| JP | 2001-159843 | | 6/2001 |
| JP | 2002-148880 | | 5/2002 |
| JP | 2002-162810 | | 6/2002 |
| JP | 2003-076098 | | 3/2003 |
| JP | 2003-241578 | | 8/2003 |
| JP | 2004-347627 | A | 12/2004 |
| JP | 2005-91905 | | 4/2005 |
| JP | 2008-020696 | | 1/2008 |
| JP | 2008-213303 | | 9/2008 |

OTHER PUBLICATIONS

Extended European Search Report dated Dec. 1, 2011 from related European Application No. 10003301.8.

Chinese Official Action dated Jan. 14, 2013 from related application CN 201010155389.9 together with an English language translation.

* cited by examiner

IMAGE FORMING APPARATUS AND SYSTEM FOR SELECTING A DOUBLE-SIDE PRINTING METHOD BASED ON THE REMAINING TONER AMOUNT

CROSS REFERENCE TO RELATED APPLICATION

The present application claims priority from Japanese Patent Application No. 2009-130330, which was filed on May 29, 2009, the disclosure of which is incorporated herein by reference in its entirety.

BACKGROUND

The present invention relates to an image forming apparatus, an image forming system, and a program, which have a double-side printing function.

As a double-side printing method of a printing apparatus, a method (hereinafter, referred to as "double-side continuous printing method") of continuously performing a one-side printing operation and an opposite-side printing operation on a sheet consistently from start to end of a printing process was known well. On the other hand, a printing apparatus employing a method (hereinafter, referred to as "one-side continuous printing method") including a process of performing a one-side printing operation on a sheet during a period between a one-side printing operation and an opposite-side printing operation on another sheet, in other words, continuously performing the one-side printing operation on plural sheets, was suggested. In the one-side continuous printing method, since a sheet inversion time between the printing on one side of a sheet and the printing on the opposite side of the sheet is allocated to a printing operation on another sheet, the printing process can be performed faster than in the double-side continuous printing method by as much.

SUMMARY

However, in the one-side continuous printing method, as described above, the one-side printing operation is performed on other sheets between the printing on one side of a sheet and the printing on the opposite side of the sheet. Accordingly, when a colorant is lacking in the course of performing the double-side printing operation, a problem may occur in that the number of incomplete sheets of which only one side has been subjected to the printing operation is greater than that in the double-side continuous printing method.

The invention is made in view of the above-mentioned problem, and an object thereof is to provide an image forming apparatus, an image forming system, and a program which can suppress a problem that incomplete sheets (including sheets of paper) are generated due to a lack of a colorant.

According to an aspect of the invention, there is provided an image forming apparatus comprising:

a print unit which includes a container containing a colorant and is configured to perform a double-side printing operation including an operation of printing an image on one side of N non-printed sheets (N≧1) and then printing an image on an opposite side of M one-side printed sheets (M≦N) using the colorant, the double-side printing operation including a plurality of double-side printing methods in which at least one of N and M is different;

a determination unit configured to determine whether an amount of the colorant remaining in the container is equal to or greater than a threshold value; and a control unit which is configured to select one of the double-side printing methods and is configured to cause the print unit to perform the selected double-side printing method, wherein when the determination unit makes a negative determination in which the amount of the remaining colorant is less than the threshold value, the control unit performs a negative selection process of selecting the double-side printing method satisfying at least one condition of a condition that N is smaller than that when the determination unit makes an affirmative determination in which the amount of the remaining colorant is equal to or greater than the threshold value and a condition that the number of opposite-side printed sheets M is greater than that when the determination unit makes the affirmative determination.

According to an aspect of the invention, there is provided an image forming system comprising:

a print unit which includes a container containing a colorant and is configured to perform a double-side printing operation including an operation of printing an image on one side of N non-printed sheets (N≧1) and then printing an image on an opposite side of M one-side printed sheets (M≦N) using the colorant, the double-side printing operation including a plurality of double-side printing methods in which at least one of N and M is different;

a determination unit configured to determine whether an amount of the colorant remaining in the container is equal to or greater than a threshold value; and a control unit which is configured to select one of the double-side printing methods and is configured to cause the print unit to perform the selected double-side printing method, wherein when the determination unit makes a negative determination in which the amount of the remaining colorant is less than the threshold value, the control unit performs a negative selection process of selecting the double-side printing method satisfying at least one condition of a condition that N is smaller than that when the determination unit makes an affirmative determination in which the amount of the remaining colorant is equal to or greater than the threshold value and a condition that the number of opposite-side printed sheets M is greater than that when the determination unit makes the affirmative determination.

According to an aspect of the invention, there is provided a computer readable recording medium storing a program controlling an image forming apparatus comprising a print unit which includes a container containing a colorant and is configured to perform a double-side printing operation including an operation of printing an image on one side of N non-printed sheets (N≧1) and then printing an image on an opposite side of M one-side printed sheets (M≦N) using the colorant, the double-side printing operation including a plurality of double-side printing methods in which at least one of N and M is different, the program causing the image forming apparatus to perform:

determining whether an amount of the colorant remaining in the container is equal to or greater than a threshold value; and selecting, when the determination unit makes a negative determination in which the amount of the remaining colorant is less than the threshold value, one of the double-side printing methods which satisfies at least one condition of a condition that N is smaller than that when the determination unit makes an affirmative determination in which the amount of the remaining colorant is equal to or greater than the threshold value and a condition that the number of opposite-side printed sheets M is greater than that when the determination unit makes the affirmative determination; and causing the print unit to perform the selected double-side printing method.

According to an aspect of the invention, there is provided an image forming apparatus comprising:

a print unit which includes a container containing a colorant and prints an image on a sheet by applying colorant on the sheet using any one of double-side printing modes including:

a first mode in which printing is performed in an order of a first side of a first sheet and a second side of the first sheet;

a second mode in which printing is performed in order of the first side of the first sheet, a first side of a second sheet, the second side of the first sheet and a second side of the second sheet; and a third mode in which printing is performed in order of the first side of the first sheet, the first side of the second sheet, a first side of a third sheet, the second side of the first sheet, the second side of the second sheet and a second side of the third sheet;

a sensor which detects an amount of the remaining colorant in the container; and a controller connected to the print unit and the sensor, wherein the controller changes the double-side printing modes according to the amount of the remaining colorant so that when the amount of the remaining colorant detected by the sensor is equal to or higher than a first threshold value, the controller controls the print unit to perform the printing using the third mode, when the amount of the remaining colorant detected by the sensor is less than the third threshold and is equal to or higher than a second threshold, the controller controls the print unit to perform the printing using the second mode, and when the amount of the remaining colorant detected by the sensor is less than the second threshold, the controller controls the print unit to perform the printing using the first mode.

DESCRIPTION OF EXEMPLARY EMBODIMENTS

An embodiment of the invention will be described with reference to the accompanying drawings.

1. Electrical Configuration of Image Forming System

Figure 1:
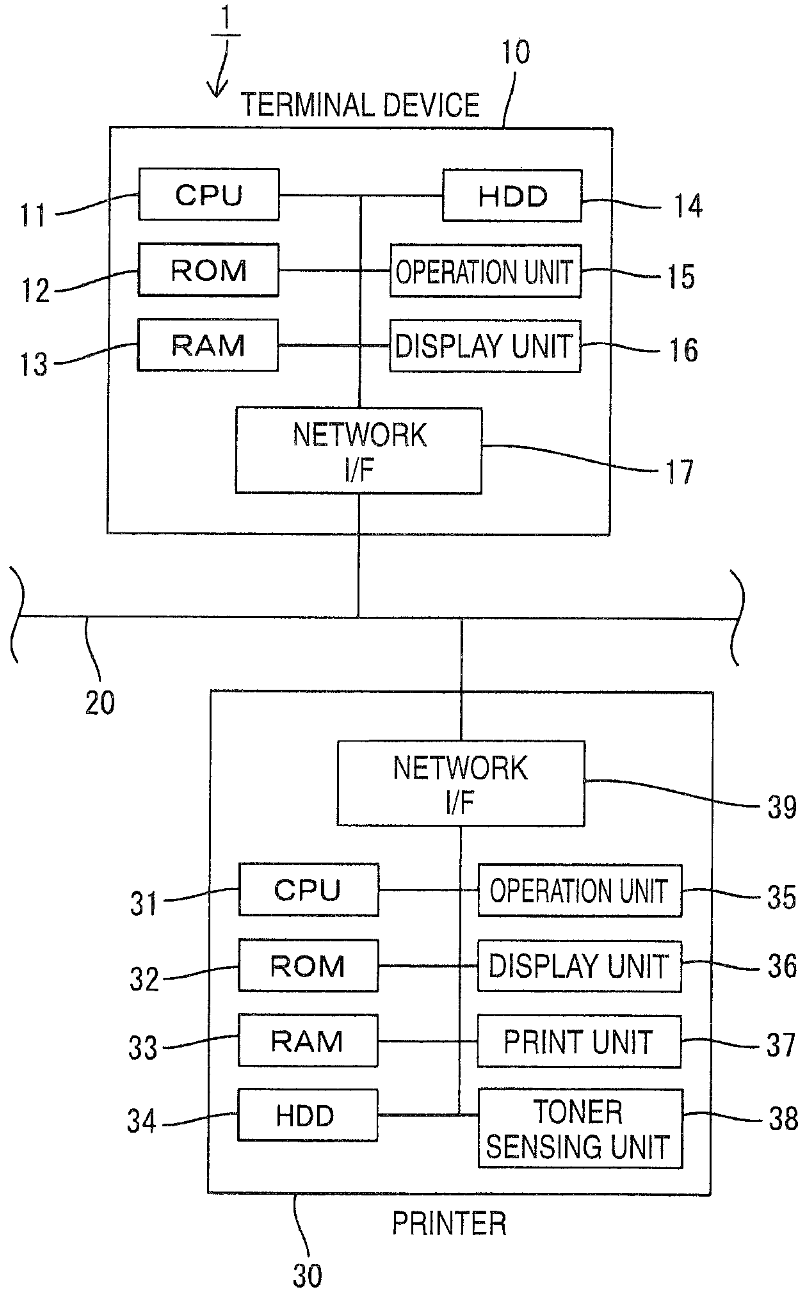
FIG. 1 is a block diagram illustrating an electrical configuration of an image forming system according to an embodiment of the invention.

FIG. 1 is a block diagram illustrating an electrical configuration of an image forming system according to the embodiment. The image forming system 1 includes a terminal device 10 (such as a personal computer which is an example of an information processing apparatus) and a printer 30 (which is an example of an image forming apparatus).

The terminal device 10 includes a CPU 11, a ROM 12, a RAM 13, a hard disk driver 14, an operation unit 15 including a keyboard or a pointing device, a display unit 16 including a liquid crystal display, and a network interface 17 connected to a communication line 20. Various programs such as OS, application software for preparing print data, and a printer driver for controlling the printer 30 are stored in the hard disk drive 14.

The printer 30 includes a CPU 31 (example of the determination unit and the control unit), a ROM 32, a RAM 33, a hard disk drive 34, an operation unit 35, a display unit 36, a print unit 37, a toner sensing unit 38, and a network interface 39. Various programs for controlling the operation of the printer 30 and a double-side printing control program for performing a double-side printing process are stored in the ROM 32. The CPU 31 stores the process results in the RAM 33 and controls the operation of the printer 30 in accordance with the program read from the ROM 32.

The operation unit 35 includes plural buttons and can be subjected to various input operations such as a print start instruction by a user. The display unit 36 includes a liquid crystal display and a lamp and can display various setting pictures and operation states. The print unit 37 prints an image based on image data on a sheet W (such as a sheet of paper and an OHP sheet). The network interface 39 is connected to an external terminal device 10 via the communication line 20 and can perform data communication therewith. The toner sensing unit 38 will be described later.

2. Inner Configuration of Printer

Figure 2:
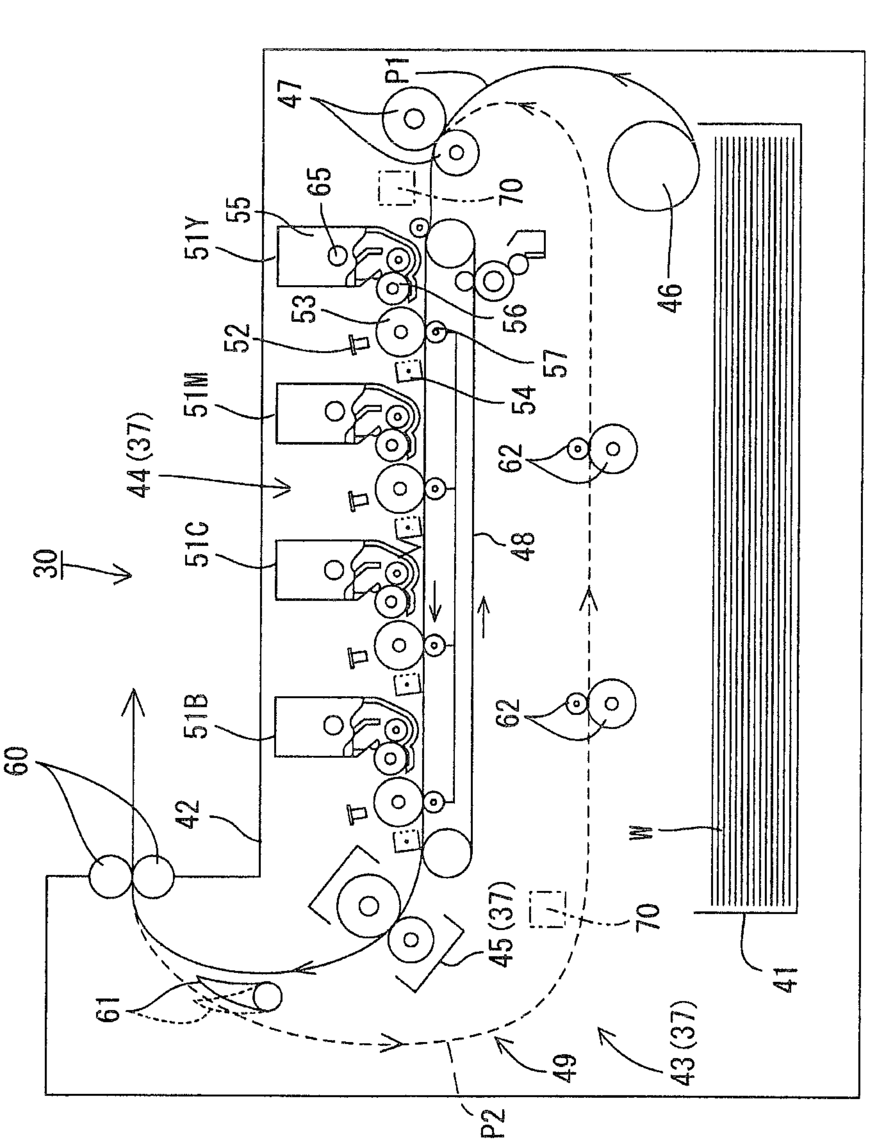
FIG. 2 is a diagram schematically illustrating an inner configuration of a printer.

FIG. 2 is a diagram schematically illustrating the inner configuration of the printer 30. In the following description, when elements are distinguished by colors, subscripts of Y (yellow), M (magenta), C (cyan), and B (black) are added to the reference numerals of the elements. When the elements are not distinguished, the subscripts are not added.

The printer 30 includes a feed tray 41, the print unit 37, and a discharge tray 42. The feed tray 41 is disposed at the bottom of the printer 30 and can receive plural sheets W.

The print unit 37 includes a conveyance mechanism 43, a process unit 44, and a fixing unit 45. The conveyance mechanism 43 includes a pickup roller 46, registration rollers 47 and 47, a sheet conveying belt 48, and an inversion mechanism 49. The pickup roller 46 picks up a sheet W received in the feed tray 41 and conveys the sheet to the registration rollers 47 and 47. The registration rollers 47 and 47 arrange the conveyed sheet W and send the sheet onto the belt 48 at a predetermined time.

The process unit 44 includes plural (for example, four) process cartridges 51Y, 51M, 51C, and 51B and plural (for example, four) exposure devices 52 corresponding to plural (for example, four) color toners (an example of the colorant). Each process cartridge 51 includes a photosensitive member 53, a charger 54, and a toner container 55 (an example of the container).

The charger 54 is a so-called scorotron type charge and uniformly electrifies the surface of the photosensitive member 53. The exposure device 52 includes plural light-emitting devices (such as LED) arranged in a line along the rotation axis of the photosensitive member 53 and forms an electrostatic image on the surface of the photosensitive member 53 by controlling the light emission of the plural light-emitting devices on the basis of image data by the colors.

The toner container 55 contains the color toners (for example, positively-charged nonmagnetic single-component toners in this embodiment) and includes a developing roller 56. The developing roller 56 charges the toner to "+" (positive polarity) and supplies the toner as a uniform thin layer to the photosensitive member 53, whereby the electrostatic latent image is developed to form a toner image (monochromatic or color image).

Each transfer roller 57 is disposed at a position interposing the belt 48 in cooperation with the corresponding photosensitive member 53. Each transfer roller 57 is supplied with a transfer voltage having the opposite polarity of the polarity of the charged toner on the photosensitive member 53 and transfers the toner image formed on the photosensitive drum 53 to the sheet W. Thereafter, the sheet W is conveyed to the fixing unit 45 by the conveyance mechanism 43, the toner image is thermally fixed by the fixing unit 45, and the resultant sheet is discharged to the discharge tray 42. The path (indicated by a solid arrow in FIG. 2) for guiding the sheet W from the feed tray 41 onto the belt 48 (print area) is called a printing conveyance path P1.

The inversion mechanism 49 includes a discharge roller 60, an inverse conveyance path P2 (indicated by a dotted arrow in FIG. 2), a flapper 61, and plural inverse conveyance rollers 62. For example, when a double-side printing operation is performed using the double-side continuous printing method, an image is printed on the back side (the bottom surface when the sheet is received in the feed tray 41) of the sheet W by the process unit 44 and the sheet is then conveyed once by the discharge roller 60.

Then, the sheet W is conveyed via the flapper 61, the inverse conveyance path P2, the inverse conveyance rollers 62, and the registration rollers 47 with the inverse rotation of the discharge roller 60, and is then sent out onto the belt 48 with the front and rear surfaces inverted. Then, an image is printed on the front surface (the top surface when the sheet is received in the feed tray 41) of the sheet W by the process unit 44 and is discharged onto the discharge tray 42.

The toner sensing unit 38 senses individually the amounts of remaining toners in the toner containers 55 of the process cartridges 51. Specifically, both side walls of each process cartridge 51 are provided with a light-transmitting window and the toner sensing unit 38 includes four sensors 65 corresponding to the four process cartridges 51.

Each sensor 65 includes a light-emitting element and a light-receiving element arranged oppositely so as to interpose the light-transmitting window of the corresponding process cartridge 51 therebetween. The light from the light-emitting element is received through the light-transmitting window by the light-receiving element and the light intensity received by the light-receiving element varies depending on the amount of remaining toner of the corresponding toner container 55. Accordingly, by causing the toner sensing unit 38 to give light-reception signals corresponding to the light intensity received by the light-receiving elements to the CPU 31, the CPU 31 can individually acquire the amounts of remaining toner in the process cartridges 51.

3. Method of Performing Double-Side Printing Process

Figure 3A:
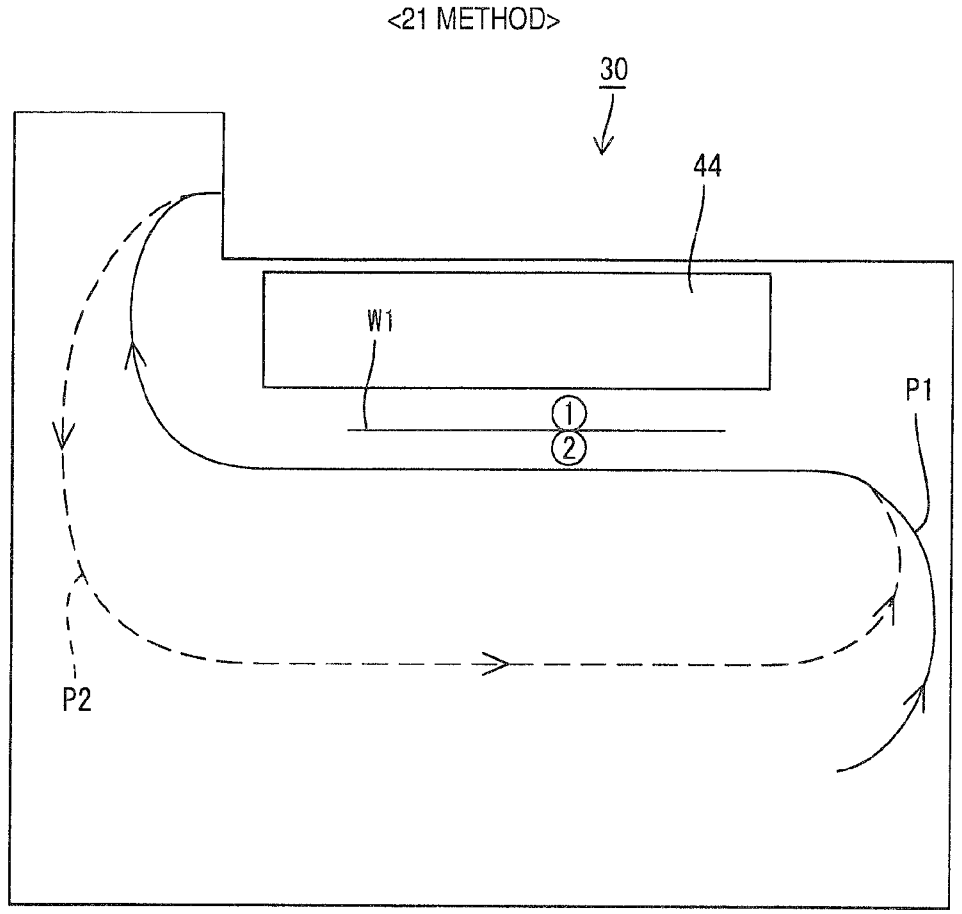
FIG. 3A is a diagram schematically illustrating a 21 method.
Figure 3B:
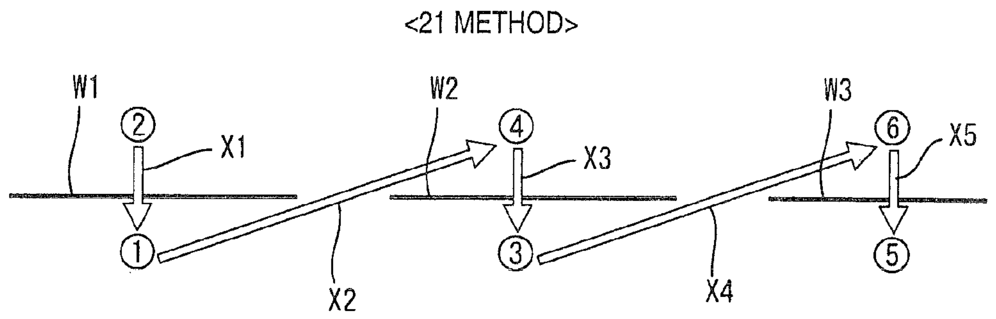
FIG. 3B is a diagram illustrating a printing sequence in the 21 method.
Figure 4A:
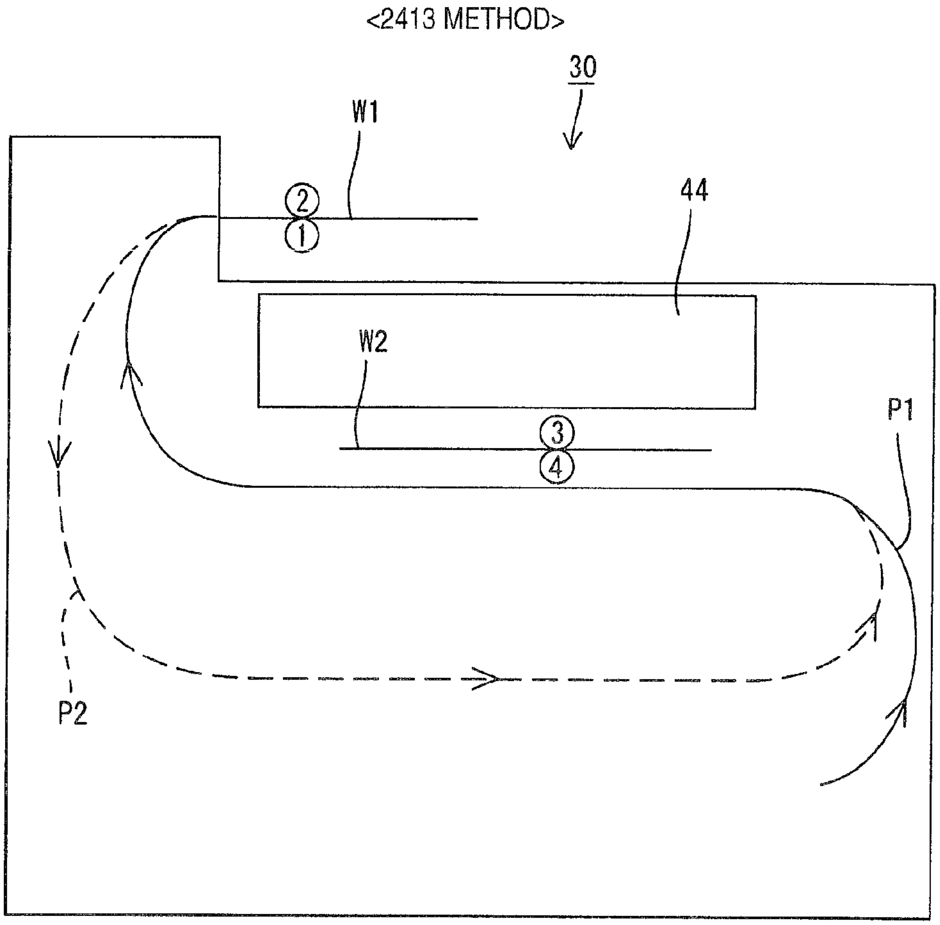
FIG. 4A is a diagram schematically illustrating a 2413 method.
Figure 4B:
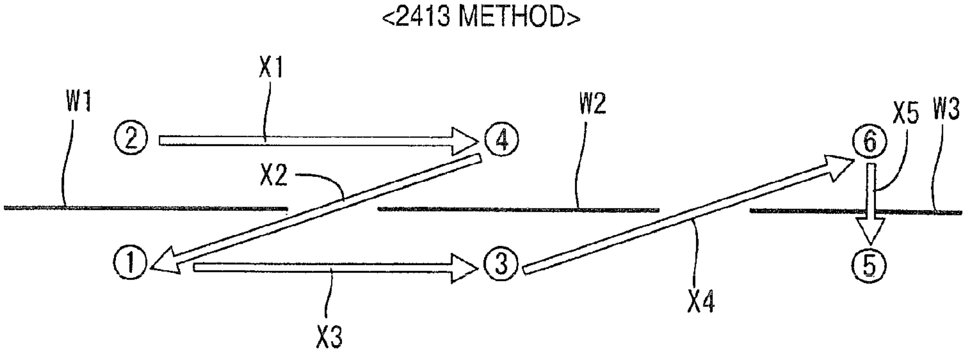
FIG. 4B is a diagram illustrating a printing sequence in the 2413 method.
Figure 5A:
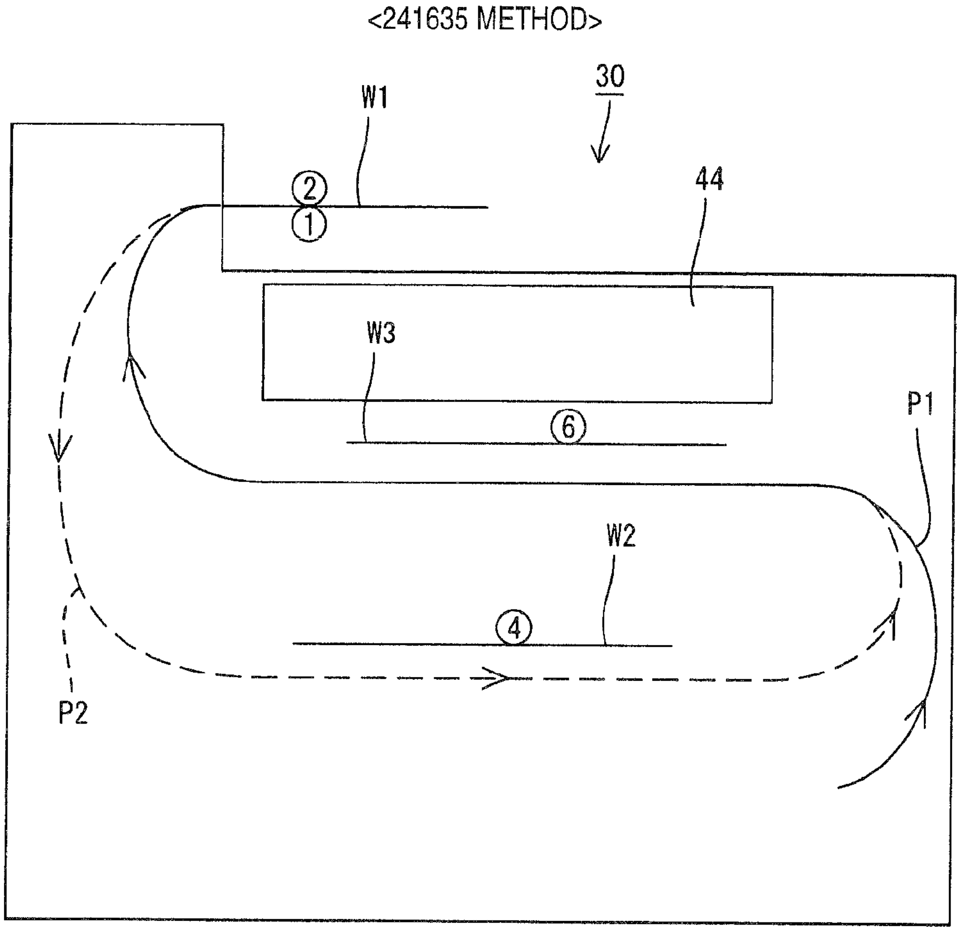
FIG. 5A is a diagram schematically illustrating a 241635 method.
Figure 5B:
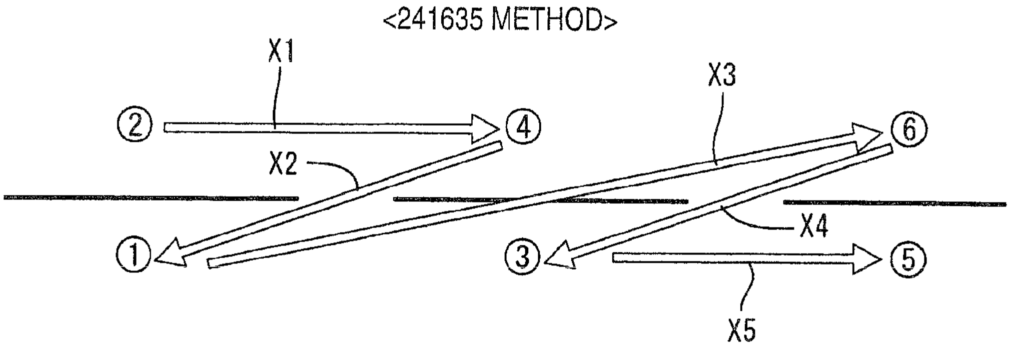
FIG. 5B is a diagram illustrating a printing sequence in the 241635 method.

FIGS. 3A to 5A are diagrams schematically illustrating methods of performing the double-side printing process and FIGS. 3B to 5B are diagrams illustrating printing sequences of the methods. In the drawings, marks of numbers surrounded with a circle are added to the sheet W. The marks mean images of the pages, the numbers mean the page numbers, and the positions of the marks on the sheets W mean the surfaces (front surface or back surface) of the sheet W having the image of the corresponding page formed thereon. The white arrows and reference signs in FIGS. 3B, 4B, and 5B represent the printing sequence.

The printer 30 can perform a double-side printing operation including an operation of printing images on one side of N (where N is 1 or greater) non-printed sheets (sheets W in which images are printed on both sides thereof) and then printing images on the opposite side of M (where M is equal to or less than N) one-side printed sheets (sheets W in which an image is printed only on one side thereof).

Hereinafter, N is referred to as "the number of one-side printed sheets N" and M is referred to as "the number of opposite-side printed sheets M". The printer 30 can selectively perform plural double-side printing methods in which at least one of the number of one-side printed sheets N and the number of opposite-side printed sheets M is different.

These methods are classified depending on whether the method is an infinite loop system or a finite loop system and depending on the greatness of the number of one-side printed sheets N. The "finite loop system" is a method of repeatedly performing an operation (finite loop) of printing images on the back side of the N one-side printed sheets W and then printing images on the front side of N one-side printed sheets W, whereby no one-side printed sheets exist whenever one finite loop is ended. On the other hand, the "infinite loop system" is a method of printing images on the back side of N one-side printed sheets W and then inserting the printing of images on the back side of a new non-printed sheet in the course of printing images on the front side of N one-side printed sheets W, whereby one-side printed sheets continuously exist other than at the start and the end of the double-side printing operation. Accordingly, the infinite loop system has a printing speed higher than that of the finite loop system, but has the higher possibility that an incomplete sheet of which only one side has an image printed thereon due to the lack of toner might be generated. Hereinafter, examples of the methods will be described.

Method in which the number of one-side printed sheets N is 1: 21 method (finite loop system)

Method in which the number of one-side printed sheets N is 2: 2413 method (finite loop system), 241635 method (infinite loop system)

Method in which the number of one-side printed sheets N is 3: 246135 method (finite loop system), 246183579 method (infinite loop system)

The "21 method" is a method (double-side continuous printing method) of a continuous back-side printing operation and a front-side printing operation on each of W1 sheets uniformly from the start of the printing to the end of the printing, where the number of one-side printed sheets N is "1" and the number of opposite-side printed sheets M is "1". For example, when images of 6 pages are printed on both sides of three sheets W, the printer 30 performs a printing operation in the following order (see FIG. 3B).

Second-page image (back side of first sheet W1)

First-page image (front side of first sheet W1)

Fourth-page image (back side of second sheet W2)

Third-page image (front side of second sheet W2)

Sixth-page image (back side of third sheet W3)

Fifth-page image (front side of third sheet W3)

As shown in FIG. 3A, until printing the first-page image on the front side of the first sheet W1 after printing the second-page image on the back side of the first sheet W1, the printing operation is not performed on the second or subsequent sheet W. Accordingly, the 21 method has a low possibility of generating an incomplete sheet, but has a low printing speed.

The "2413 method" is a finite loop system in which an operation of printing images on the back sides of two sheets W and then printing images on the front sides of the two sheets W is repeatedly performed, where the number of one-side printed sheets N is "2" and the number of opposite-side printed sheets M is "2". For example, when images of 6 pages are printed on both sides of three sheets W, the printer 30 performs a printing operation in the following order (see FIG. 4B).

Second-page image (back side of first sheet W1)
Fourth-page image (back side of second sheet W2)
First-page image (front side of first sheet W1)
Third-page image (front side of second sheet W2)
Sixth-page image (back side of third sheet W3)
Fifth-page image (front side of third sheet W3)

As shown in FIG. 4A, only after the third-page image is printed on the front side of the second sheet W2, the sixth-page image is printed on the back side of the third sheet W3. Accordingly, the 2413 method has a lower possibility of generating an incomplete sheet than that of the 21 method, but has a faster printing speed than that of the 21 method.

The "241635 method" is an infinite loop system in which images are printed on the back sides of two sheets W and then an image is printed on the back side of a new non-printed sheet at the time of printing an image on the front side of one sheet W thereof, where the number of one-side printed sheets N is "2" and the number of opposite-side printed sheets M is "1". For example, when images of 6 pages are printed on both sides of three sheets W, the printer 30 performs a printing operation in the following order (see FIG. 5B).

Second-page image (back side of first sheet W1)
Fourth-page image (back side of second sheet W2)
First-page image (front side of first sheet W1)
Sixth-page image (back side of third sheet W3)
Third-page image (front side of second sheet W2)
Fifth-page image (front side of third sheet W3)

As shown in FIG. 5A, after printing the first-page image on the front side of the first sheet W1 and before printing the third-page image on the front side of the second sheet W2, the sixth-page image is printed on the back side of the third sheet W3. Accordingly, the 241635 method has a higher possibility of generating an incomplete sheet W than that in the 2413 method, but has a faster printing speed than that in the 2413 method.

4. Printing Control Process

A printing control process carried out in the image forming system 1 will be divided into a process of the terminal device 10 and a process of the printer 30 for description.

4-1. Process of Terminal Device

When a user activates application software for treating documents or images by the use of the operation unit 15 to input a print request, the CPU 11 reads the printer driver from the hard disk drive 14 and displays a print setting picture (not shown) for setting printing conditions such as sheet size, image quality, monochrome/color, and one-side printing/double-side printing on the display unit 16.

When the user sets the printing conditions in the print setting picture and fixes the setting, the CPU 11 transmits print data (for example, PDL data) and a variety of print setting information set in the print setting picture to the printer 30.

4-2. Process of Printer

When receiving the print data and the print setting information from the terminal device 10, the CPU 31 of the printer 30 analyzes the print setting information and determines which of the one-side printing and the double-side printing is specified. When the one-side printing is specified, the CPU causes the print unit 37 to perform a one-side printing operation on one side of a non-printed sheet. On the other hand, when the double-side printing is specified, the CPU causes the print unit to perform a double-side printing process to be described later.

Figure 6A:
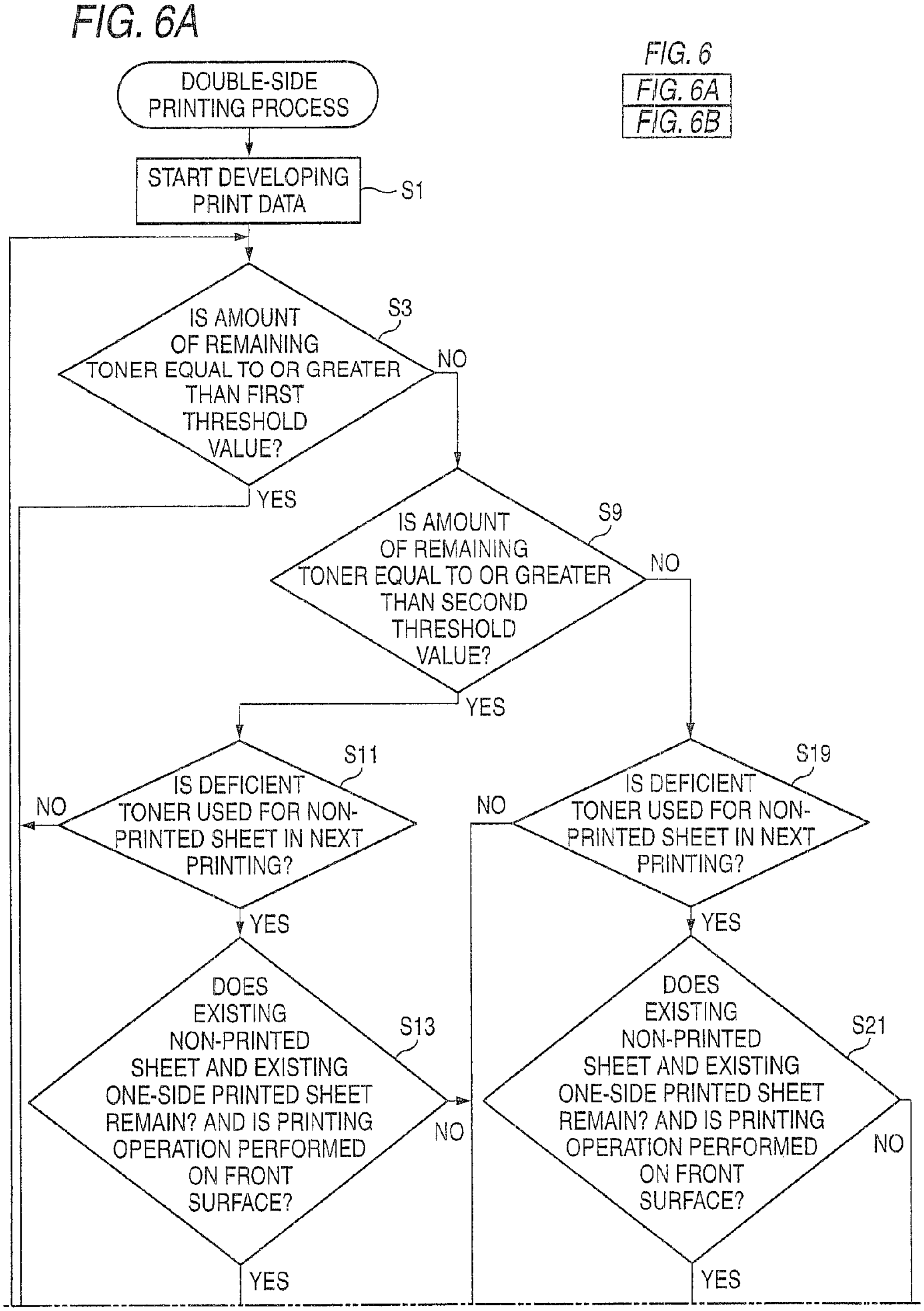
FIG. 6 is a flowchart illustrating a double-side printing process.
Figure 6B:
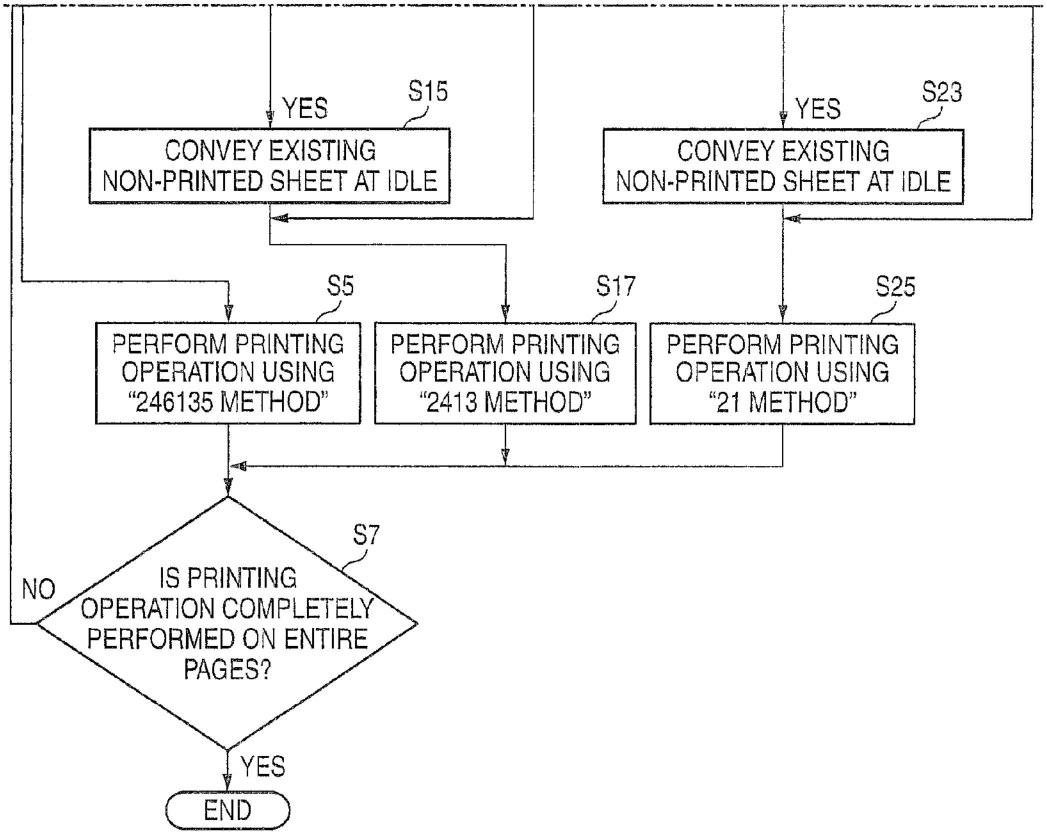

FIG. 6 is a flowchart illustrating the double-side process. It is assumed that the print data includes image data of plural pages and the double-side printing method is initially set to the "241635 method".

By performing the double-side printing process, the printer 30 can select an appropriate method corresponding to the amount of remaining toner from plural methods, thereby suppressing the incomplete sheet from being generated. This will be described below.

(1) Change from 241635 Method to 2413 Method

First, the CPU 31 starts a process of developing the image data included in the print data into bit-map data in the page order depending on the printing conditions (S1). Then, the CPU determines whether the amount of remaining toner is equal to or greater than a first threshold value for every process cartridge 51 (S3). At this time, the CPU 31 serves as the "determination unit".

When an affirmative determination that the amount of remaining toner is equal to or greater than the first threshold value is made for all the process cartridges 51 (YES in S3), a printing operation based on the image data of one page is performed on the sheet W using the "241635 method" as initially set (S5). When the image data of a page not printed remains (NO in S7), the process of S3 is performed. When the image data of all the pages is printed (YES in S7), the double-side printing process is ended.

On the other hand, when a negative determination (hereinafter, the toner determined as negative is referred to as "deficient toner") that the amount of toner remaining in at least one process cartridge 51 is less than the first threshold value is made (NO in S3), the CPU 31 determines whether the amount of remaining toner is equal to or greater than a second threshold value (smaller than first threshold value) (S9). The first threshold value and the second threshold value are not zero but are amounts of remaining toners which can permit printing images of several pages.

When an affirmative determination that the amount of remaining toner is equal to or greater than the second threshold value is made (YES in S9), the CPU determines whether a next printing operation uses the deficient toner in S3 for a non-printed sheet in the currently-selected 241635 method (the method before the negative determination is made) (S11). Here, when the next printing operation is for a one-side printed sheet, the one-side printed sheet can be generated into a double-side printed sheet by continuously performing the 241635 method. For example, in any one period of X2, X4, and X5 in FIG. 5B, the negative determination that the amount of remaining toner is less than the first threshold value is made in S3. Particularly, when this printing operation uses the deficient toner, it is possible satisfactorily to generate a complete sheet before the deficient toner further decreases by continuously performing the 241635 method.

When the next printing operation does not use the deficient toner and the 241635 method is continuously performed, the deficient toner does not further decrease, thereby not influencing the generation of an incomplete sheet. Accordingly, when the negative determination is made in S11 (NO in S11), the 241635 method is performed (S5).

On the other hand, when the next printing operation uses the deficient toner for a non-printed sheet (YES in S11) and the 241635 method is continuously performed, the incomplete sheets may increase. For example, in any one period of X1 and X3 in FIG. 5B, the negative determination that the amount of remaining toner is less than the first threshold value is made in S3. Accordingly, the CPU 31 performs a negative selection process of selecting a method satisfying at least one condition of a condition that the number of one-side printed sheets N is smaller than when the affirmative determination is made in S3 and a condition that the number of one-side printed sheets M is greater than that when the affirmative determination is made. More specifically, the 2413 method (finite loop system) in which the number of opposite-side printed sheets M is greater than that in the 241635 method (infinite loop system) is selected. Accordingly, the printing speed is lowered, but the generation of an incomplete sheet can be suppressed. At this time, the CPU 31 serves as the "control unit".

Then, the CPU 31 determines whether an existing non-printed sheet and an existing one-side printed sheet being already conveyed by the conveyance mechanism 43 exist the case of the negative determination in S3 and the first printing operation after the negative selection process is performed on the front side (the opposite side) (an image of an odd page is printed) (S13). As an example of this determination method, the determination is made on the basis of a conveyance start time of the sheets W and a printing time of the page images. Sheet detecting sensors (for example, a registration sensor denoted by reference numeral 70 and indicated by a two-dot chained line in FIG. 2) may be disposed in the vicinity of the printing conveyance path P1 and the inverting conveyance path P2 and the determination may be made on the basis of a detection signal from the sensors 70.

When it is determined that an existing non-printed sheet and an existing one-side printed sheet exist and the first printing operation is performed on the front side (YES in S13), the first printing operation using the 2413 method is performed on the existing one-side printed sheet, not on the existing non-printed sheet. The print unit 37 is controlled to discharge the existing non-printed sheet to the discharge tray 42 by conveying the existing non-printed sheet at idle without performing a printing operation (S15 and S17) and the process of S7 is then performed.

For example, in the period of X3 in FIG. 5B, when the double-side printing method is changed to the 2413 method by performing the negative selection process, the second sheet W2 may exist as the existing one-side printed sheet and the third sheet W3 may exist as the existing non-printed sheet. The first printing operation using the 2413 method is performed on the front side of the second sheet W2. Accordingly, in this case, the third sheet W3 is discharged to the discharge tray 42 without being subjected to the printing operation (S15), the third-page image is printed on the front side of the second sheet W2 in the 2413 method (S17), and the process of S7 is then performed.

On the other hand, when at least one of the existing non-printed sheet and the existing one-side printed sheet does not exist or when the first printing operation is performed on the back side (one side) (NO in S13), the process of S17 is performed without conveying the existing non-printed sheet at idle. For example, in any one period of X1, X2, X4, and X5 in FIG. 5B, the double-side printing method is changed to the 2413 method by performing the negative selection process.

More specifically, when the 2413 method is selected in the period of X1 by performing the negative selection process, the first sheet W1 may exist as the one-side printed sheet. However, the first printing operation using the 2413 method is performed on the back side of the second sheet W2. Accordingly, the fourth-page image is printed on the second sheet W2 using the 2413 method without conveying the second sheet at idle (S17) and the process of S7 is then performed.

(2) Change from 2413 Method to 21 Method

When the negative determination that the amount of remaining toner is less than the second threshold value is made (NO in S9), the CPU 31 determines whether the next printing operation using the currently-selected method is performed on a non-printed sheet using a deficient toner in S9 (S19). Here, the currently-selected method may be the 241635 method or the 2413 method. When the amount of remaining toner decreases to be less than the second threshold value in the course of performing a one-side printing operation and a double-side printing operation is then performed, the currently-selected method is the 241635 method. On the other hand, when the amount of remaining toner has already decreased to be less than the first threshold value in the course of performing a double-side printing operation, the currently-selected method is the 2413 method. The example where the currently-selected method is the 2413 method will be described below.

When the negative determination is made in S19 (NO in S19), the CPU 31 continuously performs the 2413 method in S17. For example, in any one period of X2, X3, and X5 in FIG. 4B, the negative determination that the amount of remaining toner is less than the second threshold value is made in S9. On the other hand, when the affirmative determination is made in S19 (YES in S19), the CPU selects the 21 method in which the number of one-side printed sheets N is smaller than that in the 2413 method is selected by performing the negative selection process. For example, in any one period of X1 and X4 in FIG. 4B, the negative determination that the amount of remaining toner is less than the second threshold value is made in S9. Accordingly, the printing speed is lowered but the generation of an incomplete sheet W is suppressed.

Then, the CPU 31 determines whether an existing non-printed sheet and an existing one-side printed sheet exist in the case of the negative determination in S9 and the first printing operation after the negative selection process is performed on the front side (S21). When the affirmative determination is made (YES in S21), the first printing operation using the 21 method is performed on the existing one-side printed sheet, not on the existing non-printed sheet. The print unit 37 is controlled to discharge the existing non-printed sheet to the discharge tray 42 by conveying the existing non-printed sheet at idle without performing a printing operation (S23 and S25) and the process of S7 is then performed.

For example, in the period of X1 in FIG. 4B, the double-side printing method is changed to the 21 method by performing the negative selection process. On the other hand, when the negative determination is made (NO in S21), the process of S25 is performed without conveying the existing non-printed sheet at idle (S23). For example, in any one period of X2 to X5 in FIG. 4B, the double-side printing method is changed to the 21 method by performing the negative selection process.

Figure 7:
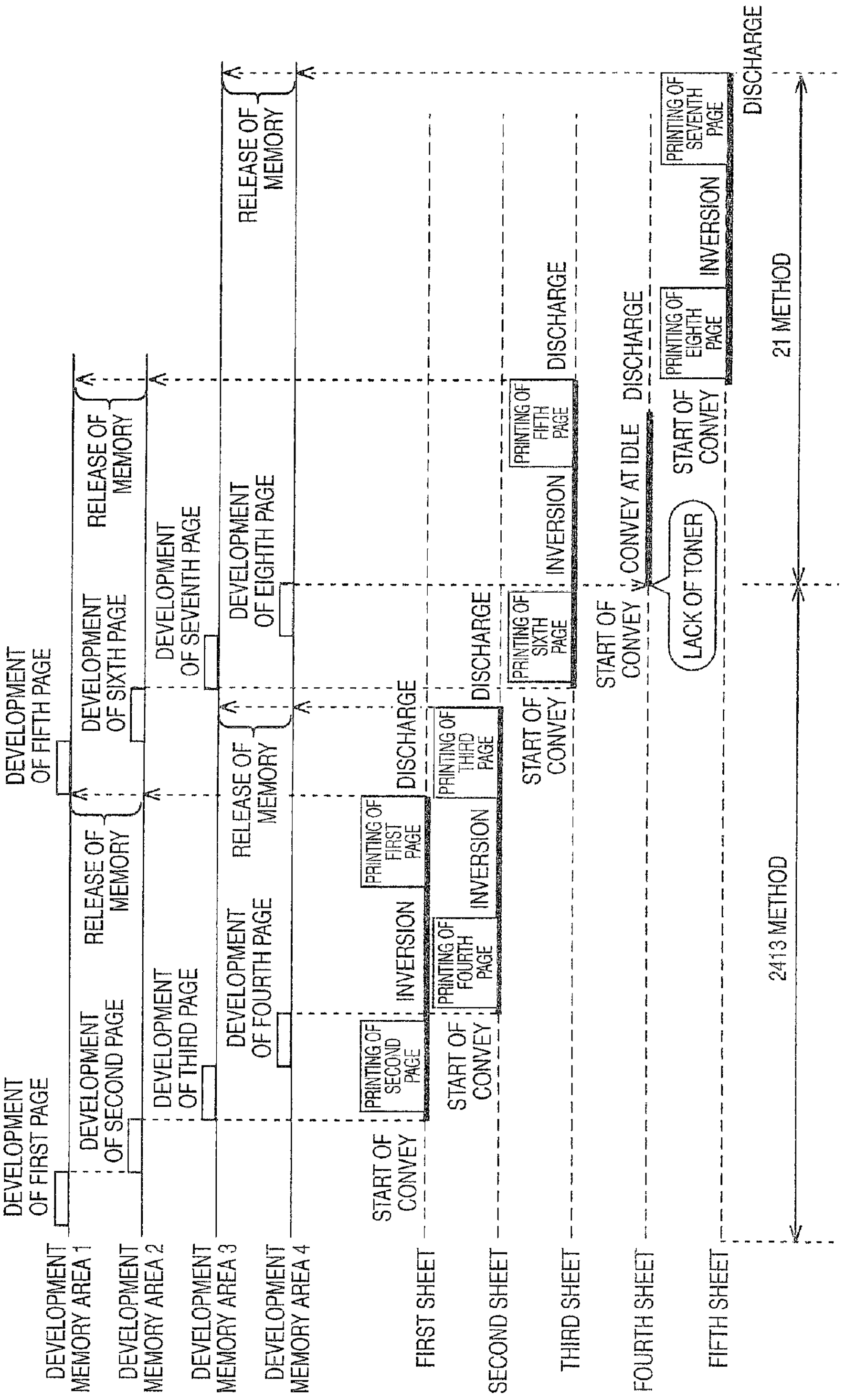
FIG. 7 is a timing diagram illustrating utilization situations of development memories and print states of sheets W in performing the double-side printing process.

FIG. 7 is a timing chart illustrating utilization states of the development memories and printing states of the sheets W in performing the double-side printing process. More specifically, an example where images of eight pages are printed on both sides of four sheets W will be described with reference to FIG. 7. At the time of performing the 2413 method, the CPU 31 sequentially develops image data of the first to fourth pages in plural (four in this embodiment) development memory areas of the RAM 33. When the process of developing the image data of the second page is ended, the conveyance of the first sheet W1 from the feed tray 41 is started and the second-page image is printed on the back side of the first sheet W1.

Then, when the process of developing the image data of the fourth page is ended, the conveyance of the second sheet W2 from the feed tray 41 is started and the fourth-page image is printed on the back side of the second sheet W2. When the first sheet W1 is inverted in the inverting conveyance path P2 and is conveyed again to the print area, the first-page image is printed on the front side of the first sheet W1. Accordingly, the first sheet W1 becomes a complete sheet.

When the first-page image is printed, the developed data of the first and second pages is deleted from development memory areas 1 and 2. According to this configuration, even when the double-side printing is stopped due to a paper jam or the like before the first-page image is completely printed, it is possible to generate the complete sheet W with first-page and second-page images printed on both sides thereof using the developed data stored in the development memory areas. The CPU 31 deletes the developed data of the first and second pages and then sequentially develops the image data of the fifth to eighth pages.

Thereafter, when the second sheet W2 is inverted in the inverting conveyance path P2 and is conveyed again to the print area, the third-page image is printed on the front side of the second sheet W2, whereby one finite loop is completed. At this time, the developed data of the third and fourth pages is deleted from development memory areas 3 and 4.

In a next finite loop, when the process of developing the image data of the sixth page is ended, the conveyance of the third sheet W3 from the feed tray 41 is started and the sixth-page image is printed on the back side of the third sheet W3. Thereafter, when the process of developing the image data of the eighth page is ended, the conveyance of the fourth sheet W4 from the feed tray 41 is started. However, when the amount of remaining toner is less than the second threshold value and the negative selection process is thus performed before performing a printing operation on the back side of the fourth sheet W4 (NO in S9, YES in S19, and YES in S21 of FIG. 6), the fourth sheet W is conveyed at idle to perform the 21 method (S23).

When the third sheet W3 is inverted in the inverting conveyance path P2 and is conveyed again to the print area, the fifth-page image is printed on the front side of the third sheet W3. Accordingly, the third sheet W3 becomes a complete sheet. The conveyance of the fifth sheet W5 from the feed tray 41 is started and the eight-page image is printed on the back side of the fifth sheet W5. Thereafter, when the fifth sheet W5 is inverted in the inverting conveyance path P2 and is conveyed again to the print area, the seventh-page image is printed on the front side of the fifth sheet W5. Accordingly, the fifth sheet W5 becomes a complete sheet.

5. Advantages

According to this embodiment, when the negative determination that the amount of remaining toner is less than a threshold value (first threshold value and second threshold value) is made, the printer 30 selects a method satisfying one of the condition that the number of one-side printed sheets N is smaller than that in case of the affirmative determination and the condition that the number of opposite-side printed sheets M is greater than that in case of the affirmative determination (negative selection process). Accordingly, since the double printing operation on one side and the opposite side of the same sheet W is performed in relatively-close order in comparison with the case where the same double-side printing method as before the negative determination is made is continuously performed, it is possible to suppress the problem that an incomplete sheet is generated.

When the negative determination that the amount of remaining toner is less than the threshold value is made, an existing non-printed sheet and an existing one-side printed sheet being already conveyed in the same manner as before making the negative determination may exist. At this time, since the first printing operation after the negative selection process is performed on the non-printed sheet and the one-side printed sheets existing at the same time increase, the possibility of generating an incomplete sheet increases. On the contrary, according to this embodiment, it is possible to suppress the generation of an incomplete sheet by performing the first printing operation on the existing one-side printed sheet, not on the existing non-printed sheet.

Since the amount of remaining toner is compared with a proper threshold value corresponding to the amount of remaining toner, the double-side printing method can be changed to a method satisfying at least one of the condition that the number of one-side printed sheets N is small and the condition that the number of opposite-side printed sheets M is great.

In the invention, unlike the above-mentioned embodiment, for example, when the amount of remaining toner is less than the first threshold value, the "241635 method" may be changed to the "21 method" at once. However, in this case, the printing speed is much lowered. On the contrary, in the embodiment, the printing method is gradually changed to a method satisfying at least one of the condition that the number of one-side printed sheets N is small and the condition that the number of opposite-side printed sheets M is great, as the amount of remaining toner decreases. That is, the "241635 method" is gradually changed to the "2413 method" and the "21 method". Accordingly, it is possible to suppress the printing speed from being much lowered as the amount of remaining toner decreases.

Since it is determined on the basis of the determination result on the amount of remaining toner used in the currently-performed double-side printing operation whether the negative selection process should be performed, it is possible to suppress the negative selection process from being uselessly performed on the basis of the amount of remaining toner not used in the double-side printing operation.

When the negative determination that the amount of remaining toner is less than the threshold value is made, but the next printing operation without performing the negative selection process uses the deficient toner for a non-printed sheet or the next printing operation is performed on a one-side printed sheet, the negative selection process is not performed. Accordingly, it is possible to suppress the negative selection process from being uselessly performed.

Other Embodiments

The invention is not limited to the above-mentioned embodiment described with reference to the drawings, but, for example, the following aspects are included in the technical scope of the invention. Particularly, from among the elements of the embodiments, elements other than the essential elements of the invention are accessory and can thus be omitted accordingly.

(1) The double-side printing process is performed by the printer 30 in the above-mentioned embodiment, but the invention is not limited to this configuration. For example, at the time of setting the printing conditions in the terminal device 10, information on the amount of remaining toner is acquired from the printer 30. Then, the CPU 11 of the terminal device 10 compares the amount of remaining toner with the threshold value on the basis of the information and makes a determination, selects a double-side printing method on the basis of the determination condition, and notifies the printer 30 of the selected method. In this case, the CPU 11 serves as "a part of the determination unit and the control unit". The comparison and determination of the amount of remaining toner and the threshold value may be performed by the CPU 31 of the printer 30 and the comparison result may be transmitted to the terminal device 10.

(2) The LED-type printer 30 is exemplified as the image forming apparatus in the above-mentioned embodiment, but the invention is not limited to this configuration. Another electrophotographic type image forming apparatus such as a polygon mirror type may be employed and an inkjet type image forming apparatus may be employed. Color ink other than four colors may be employed and a monochromatic (for example, black and white) printer may be employed.

(3) The amount of remaining toner is directly sensed by the sensor 65 in the above-mentioned embodiment, but the invention is not limited to this configuration. For example, the amount of remaining toner may be predicted on the basis of the number of printed sheets, the number of revolutions of the photosensitive member or the developing roller, and the like at the time of replacing the process cartridge with a new one. In this configuration, the sensor 65 is not necessary.

(4) The example where a user inputs a print request or sets the printing conditions by the use of the terminal device 10 is described in the above-mentioned embodiment, but the invention is not limited to this configuration. For example, print data may be stored in the hard disk driver 34 of the printer 30 or an external memory and the double-side printing process may be performed by causing the user to input a request for performing the double-side printing process based on the print data by the use of the operation unit 35.

(5) The amount of remaining toner is always compared with the first threshold value and the second threshold value in the above-mentioned embodiment, but the invention is not limited to this configuration. For example, the amount of remaining toner may be compared with a threshold value and the threshold value may be changed depending on the number of one-side printed sheets N using the currently-selected method. Specifically, the threshold value is set to a value of the amount of remaining toner necessary for printing a one-page image×the number of one-side printed sheets N×2 (both sides). According to this configuration, when the currently-selected method is the finite loop system, the images corresponding to at least one finite loop can be printed using the deficient toner even after the negative determination that the amount of remaining toner is less than the threshold value, thereby preventing the generation of an incomplete sheet. In the infinite loop system, it is also possible to prevent the generation of an incomplete sheet more effectively.

(6) An example where an infinite loop system is changed to a finite loop system at the time of performing the negative selection process and an example where a finite loop system is changed to a finite loop system in which the number of one-side printed sheets N is smaller than that in the finite loop system are described in the above-mentioned embodiment, but the invention is not limited to this configuration. An infinite loop system may be changed to an infinite loop system with the smaller number of one-side printed sheets N and/or the greater number of opposite-side printed sheets M.

(7) When an existing non-printed sheet and an existing one-side printed sheet exist (YES in S13), the existing non-printed sheet is discharged without performing the printing operation thereon in the above-mentioned embodiment, but the invention is not limited to this configuration. The existing non-printed sheet may stand by without being discharged or may be conveyed to the inverting conveyance path P2 and the existing non-printed sheet may be subjected to a printing operation after the one-side printed sheet M is subjected to a printing operation. However, with the configuration of the above-mentioned embodiment, it is possible to perform the negative selection process without performing any particular process of causing a non-printed sheet to stand by or the like.

(8) In the above exemplary embodiments, the ROM 32 storing the double-side printing control program for performing the double-side printing process is employed as an example of the computer readable recording medium according to the invention. However, the computer readable recording medium according to the invention is not limited to the ROM. The computer readable recording medium according to the invention may be any computer readable recording medium, such as a hard disk, an optical disk (CD-ROM, DVD-ROM, etc.), flash memory and the like, storing the program.

What is claimed is:

1. An image forming apparatus comprising:

a print unit which includes a container containing a colorant and configured to perform a double-side printing operation including an operation of printing an image on one side of N non-printed sheets ($N \geqq 1$) and then printing an image on an opposite side of M one-side printed sheets ($M \leqq N$) using the colorant, the double-side printing operation including:

a first double-side printing method in which N is a first value, and a second double-side printing method in which N is a second value, the second value being greater than the first value;

a determination unit configured to determine whether an amount of the colorant remaining in the container is equal to or greater than a threshold value; and a control configured to:

select one of the first double-side printing method, and the second double-side printing method, and cause the print unit to perform printing using the selected double-side printing method, wherein:

when the determination unit determines that the amount of the remaining colorant is less than the threshold value, the control unit selects the first double-side printing method, and when the determination unit determines that the amount of the remaining colorant is equal to or greater than the threshold value, the control unit selects the second double-side printing method.

2. The image forming apparatus according to claim 1, wherein the print unit includes a conveyance mechanism conveying a non-printed sheet, and when the determination unit determines that the amount of the remaining colorant is less than the threshold value and when both an existing one-side printed sheet and the existing non-printed sheet are being conveyed by the conveyance mechanism, the control unit, after the selecting, performs a first printing operation on the existing one-side printed sheet without performing the first printing operation on the existing non-printed sheet.

3. The image forming apparatus according to claim 2, wherein the control unit controls the print unit to discharge the existing non-printed sheet without performing the printing operation on the existing non-printed sheet.

4. The image forming apparatus according to claim 1, wherein the determination unit sets the threshold value to be greater as N becomes greater.

5. The image forming apparatus according to claim 1, wherein the determination unit compares the amount of remaining colorant with a plurality of different threshold values set to correspond to the amount of remaining colorant, and the control unit performs the selecting when the determination unit determines that the amount of the remaining colorant is less than the threshold value on the threshold values corresponding to the amount of remaining colorant.

6. The image forming apparatus according to claim 1, wherein the print unit includes a plurality of the containers containing the colorants of different colors and performs the printing operation using the colorants in the plurality of containers, the determination unit determines whether the amount of remaining colorant in each container is equal to or greater than the threshold value, and the control unit performs the selecting on the basis of the determination result of the determination unit only on the colorants used in the double-printing operation.

7. The image forming apparatus according to claim 1, wherein the print unit includes a plurality of the containers containing the colorants of different colors and performs the printing operation using the colorants in the plurality of containers, the determination unit determines whether the amount of remaining colorant in each container is equal to or greater than the threshold value, in the case that the determination unit determines that the amount of the remaining colorant is less than the threshold value, the control unit does not perform the selecting when a next printing operation, which is performed if the selecting in response to the determination in which the amount of the remaining colorant is less than the threshold value is not performed, does not use the colorant determined so that the amount is less than the threshold value for the non-printed sheet, and the control unit performs the selecting when the next printing operation uses the colorant which is less than the threshold value.

8. An image forming system comprising:

a print unit which includes a container containing a colorant and configured to perform a double-side printing operation including an operation of printing an image on one side of N non-printed sheets ($N \geqq 1$) and then printing an image on an opposite side of M one-side printed sheets ($M \leqq N$) using the colorant, the double-side printing operation including:

a first double-side printing method in which N is a first value, and a second double-side printing method in which N is a second value, the second value being greater than the first value;

a determination unit configured to determine whether an amount of the colorant remaining in the container is equal to or greater than a threshold value; and a control unit configured to:

select one of the first double-side printing method, and the second double-side printing method and cause the print unit to perform printing using the selected double-side printing method, wherein:

when the determination unit determines that the amount of the remaining colorant is less than the threshold value, the control unit selects the first double-side printing method, and when the determination unit determines that the amount of the remaining colorant is equal to or greater than the threshold value, the control unit selects the second double-side printing method.

9. A non-transitory computer readable medium storing a program controlling an image forming apparatus comprising a print unit which includes a container containing a colorant and configured to perform a double-side printing operation including an operation of printing an image on one side of N non-printed sheets ($N \geqq 1$) and then printing an image on an opposite side of M one-side printed sheets ($M \leqq N$) using the colorant, the double-side printing operation including a first double-side printing method in which N is a first value, and a second double-side printing method in which N is a second value, the second value being greater than the first value, the program causing the image forming apparatus to perform:

determining whether an amount of the colorant remaining in the container is equal to or greater than a threshold value; and selecting, when it is determined that the amount of the remaining colorant is less than the threshold value, one of the first double-side printing method, and the second double-side printing method; and causing the print unit to perform the selected double-side printing method, wherein:

when the amount of the remaining colorant is less than the threshold value, the first double-side printing method is selected, and when the amount of the remaining colorant is equal to or greater than the threshold value, the second double-side printing method is selected.

10. An image forming apparatus comprising:

a print unit which includes a container containing a colorant and prints an image on a sheet by applying colorant on the sheet using any one of double-side printing modes including:

a first mode in which printing is performed in an order of a first side of a first sheet and a second side of the first sheet;

a second mode in which printing is performed in order of the first side of the first sheet, a first side of a second sheet, the second side of the first sheet and a second side of the second sheet; and a third mode in which printing is performed in order of the first side of the first sheet, the first side of the second sheet, the second side of the first sheet, a first side of a third sheet, the second side of the second sheet and a second side of the third sheet;

a sensor which detects an amount of the remaining colorant in the container; and a controller connected to the print unit and the sensor, wherein the controller changes the double-side printing modes according to the amount of the remaining colorant so that when the amount of the remaining colorant detected by the sensor is equal to or higher than a first threshold value, the controller controls the print unit to perform the printing using the third mode, when the amount of the remaining colorant detected by the sensor is less than the first threshold value and is equal to or higher than a second threshold value, the controller controls the print unit to perform the printing using the second mode, and when the amount of the remaining colorant detected by the sensor is less than the second threshold value, the controller controls the print unit to perform the printing using the first mode.

* * * * *